(12) United States Patent
Harui

(10) Patent No.: US 7,104,694 B2
(45) Date of Patent: Sep. 12, 2006

(54) BEARING APPARATUS FOR CAMSHAFT IN ENGINE

(75) Inventor: Jun Harui, Machida (JP)

(73) Assignee: Nissan Motor Co., Ltd., Yokohama (JP)

( * ) Notice: Subject to any disclaimer, the term of this patent is extended or adjusted under 35 U.S.C. 154(b) by 483 days.

(21) Appl. No.: 10/445,889

(22) Filed: May 28, 2003

(65) Prior Publication Data
US 2003/0223664 A1 Dec. 4, 2003

(30) Foreign Application Priority Data
Jun. 4, 2002 (JP) ............... 2002-163415

(51) Int. Cl.
*F01M 1/06* (2006.01)
(52) U.S. Cl. .................... 384/433; 123/90.34
(58) Field of Classification Search ........... 384/432, 384/433, 434; 123/90.27, 90.33, 90.34
See application file for complete search history.

(56) References Cited

U.S. PATENT DOCUMENTS 4,199,202 A * 4/1980 Maeda .................. 384/432
4,258,673 A * 3/1981 Stoody et al. ........... 123/90.34
5,052,351 A 10/1991 Nishimura et al.
5,954,019 A 9/1999 Yoshikawa et al.
6,186,105 B1 2/2001 Yonezawa
6,209,509 B1 4/2001 Kammeraad et al.

FOREIGN PATENT DOCUMENTS

EP 1 046 793 A2 10/2000
EP 1 201 884 A2 5/2002

* cited by examiner

Primary Examiner—Thomas R. Hannon
(74) Attorney, Agent, or Firm—Foley & Lardner LLP

(57) ABSTRACT

A bearing cap is bolted to the cylinder head by a cap bolt to fix relative position of the camshaft to the cylinder head. An oil escape bore that connects a cap bolt insert bore formed in the bearing cap through a chain casing to an oil pan is formed in the bearing cap, wherein the oil escape bore is positioned with a distance from a cylinder-head meeting surface of the bearing cap. As a result the oil escape bore is formed without damaging mounting performance of the bearing cap to the cylinder head.

14 Claims, 4 Drawing Sheets

BEARING APPARATUS FOR CAMSHAFT IN ENGINE

BACKGROUND OF THE INVENTION

1. Field of the Invention

The present invention relates to a bearing apparatus for a camshaft in an engine and in particular, to positioning an oil escape bore formed in a bearing cap of the bearing apparatus.

2. Background Art

There is an earlier bearing apparatus for a camshaft in a cylinder head in an engine comprising a shaft bearing portion formed in a cylinder head and a bearing cap where the bearing cap holds the camshaft by being connected to the shaft bearing portion. A large-size bearing cap of such bearing apparatus is connected to a chain casing in front. This bearing cap is placed outside of a rocker cover mounted on the cylinder head.

Therefore, a head of a cap bolt fastening the bearing cap to the cylinder head is exposed to an engine room. Accordingly lubricant oil supplied to the camshaft permeates into a meeting clearance between the bearing cap and the cylinder head and then, leaks through an insert bore of the cap bolt formed in the bearing cap into the engine room.

Coping with the above oil leakage, a groove is formed on the cylinder-head meeting surface of the bearing cap and the lubricant oil reserved in the insert bore is discharged through the groove and is returned back to an oil pan.

SUMMARY OF THE INVENTION

Providing a groove on a cylinder-head meeting surface of a bearing cap brings out the following problem. Tight and close connection between the bearing cap and the cylinder head is required. However, in the above earlier technology a corner is formed in the cylinder-head meeting surface by providing the groove on the cylinder-head meeting surface of the bearing cap and with tightening the bearing cap to the cylinder head, pressure concentrates on the corner between the bearing cap and the cylinder head.

As a result, the bearing cap is possibly damaged and mounting the bearing cap to the cylinder head with serious care is required. And it is required to provide the cylinder-head meeting surface of sufficient thickness in order to accomplish good sealing performance between the bearing cap and the cylinder head and bearing performance of the bearing cap. Accordingly machining amount to the groove gets large in the bearing cap by providing the groove on the cylinder-head meeting surface.

The present invention provides a bearing apparatus for a camshaft in an engine where a device to discharge lubricant oil reserved in an insert bore of a cap bolt is arranged without damaging mounting performance of a bearing cap to a cylinder head.

One aspect of the present invention provides a bearing apparatus for a camshaft disposed in a cylinder head in an engine comprising:

a bearing cap fastened to the cylinder head to fix relative position of the camshaft to the cylinder head; and a cap bolt that fastens the bearing cap to the cylinder head, wherein the bearing cap comprises:

a cylinder head meeting surface connected to the cylinder head;

a first wall that forms a bolt insert bore where the cap bolt is inserted;

a second wall that forms part of the first wall, wherein the second wall forms;

an oil escape bore with a distance above and from the cylinder-head meeting surface, and the oil escape bore connects the bolt insert bore to an outside of the bearing cap, wherein the oil escape bore penetrates through the second wall.

These and other aspects, and features of this invention will be understood from the following description with accompanying drawings.

DETAILED EXPLANATION OF THE PREFERRED EMBODIMENTS

The preferred embodiments according to the invention will be explained with reference to the drawings as follows.

Figure 1:
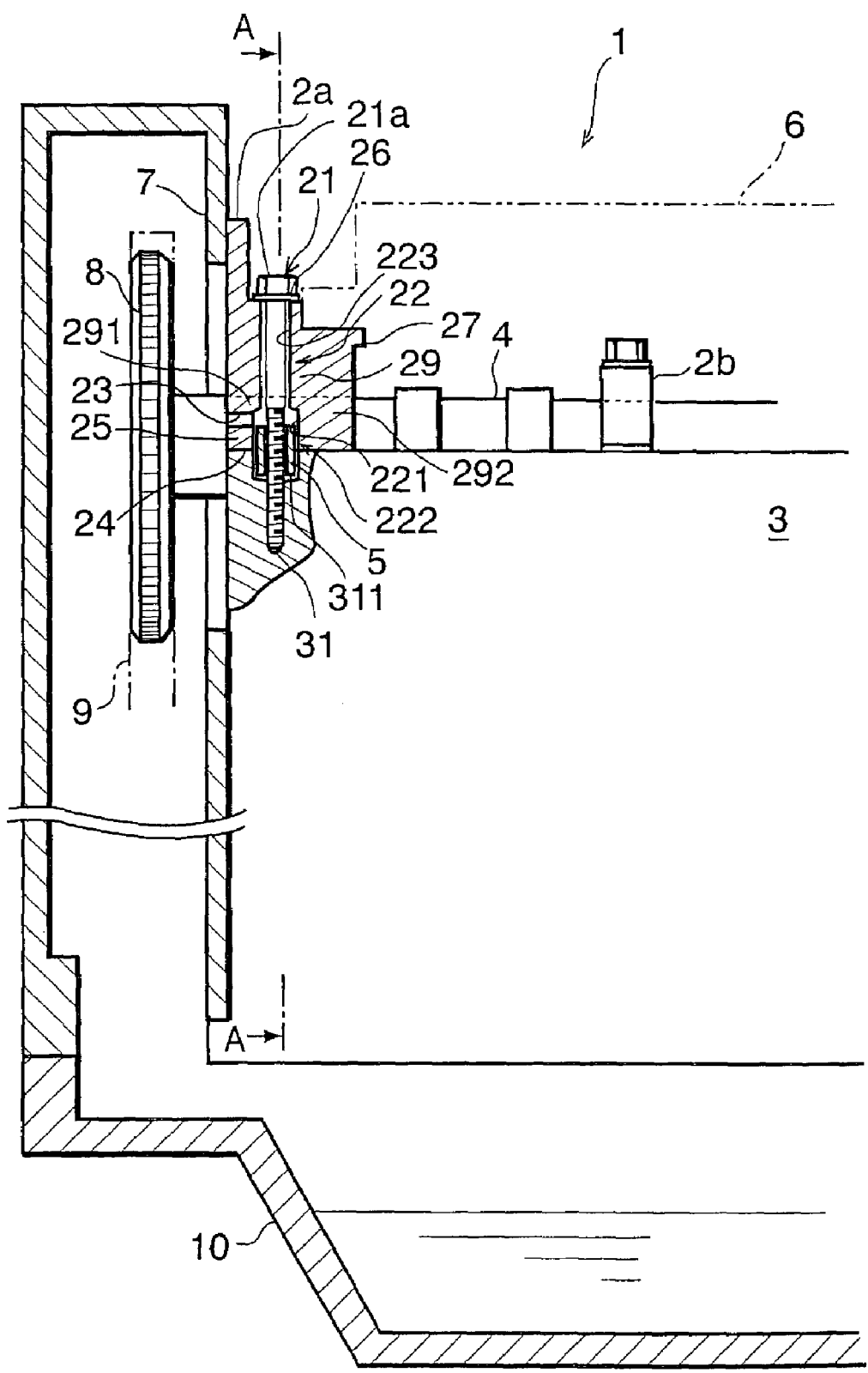
FIG. 1 is a partial cross section view of an engine including a first bearing cap of an embodiment according to the invention.

FIG. 1 is a partial cross section view of an internal combustion engine (engine hereinafter) 1 for an automobile including a bearing cap 2a (first bearing cap hereinafter) disposed in the most forward position of engine 1 without a rocker cover being mounted. In the embodiment, a bearing apparatus for a camshaft comprises first bearing cap 2a and a cap bolt 21 described later. In the figure, a left side is a front side of engine 1.

A cylinder head 3 is fixed on a cylinder block (not shown) of engine 1. Cylinder head 3 has a shaft bearing surface of semi round shape receiving a journal of a camshaft 4. Camshaft 4 is placed on the shaft bearing surface and is fixed in the upper and lower direction and in the right and left direction of engine 1 by mounting first bearing cap 2a and a second bearing cap 2b—fifth bearing cap (not shown) disposed in the rear side of first bearing cap 2a to cylinder head 3 from above engine 1.

First bearing cap 2a and the other bearing caps are fixed to cylinder head 3 by respective cap bolts. An insert bore 22 (bolt insert bore hereinafter) of a cap bolt 21 is formed in a first wall 29 of first bearing cap 2a. Cap bolt 21 bolts first bearing cap 2a to cylinder head 3. Bolt insert bore 22 has a lower portion 222 having a first diameter at the side of cylinder head 3 and an upper portion 223 having a second diameter other than the first portion. The first diameter is larger than the second diameter. Further, the lower portion 222 comprises a first portion 221 formed in first wall 29 of first bearing cap 2a and a second portion 311 formed in cylinder head 3.

On the other hand, a screw bore 31 of cap bolt 21 is formed in cylinder head 3 and a diameter of screw bore 31 is smaller than the second diameter of bolt insert bore 22. A cylindrical positioning collar 5 is inserted into lower portion 222 (enlarged diameter portions 221, 311) of bolt insert bore 22 in first bearing cap 2a and in cylinder head 3. Positioning collar 5 has an outer diameter as large as the first diameter of lower portion 221, 311 extending between the lower end of first bearing cap 2a and the upper end of cylinder head 3. Therefore, positioning collar 5 positions first bearing cap 2a to cylinder head 3 when mounting first bearing cap 2a to cylinder head 3. Cap bolt 21 is inserted into bolt insert bore 22 from above engine 1 and penetrates through positioning collar 5 in the upper and lower direction and is screwed into screw bore 31 of cylinder head 3 where a cap bolt head 21a of cap bolt 21 contacts a shoulder (seat) 26 of first bearing cap 2a.

An oil escape bore 23 is formed above a cylinder-head meeting surface 24 with a distance of a portion 25 from cylinder-head meeting surface 24 in a second wall 291 that is an engine-front side of first wall 29 of bearing cap 2a. Oil escape bore 23 has openings to first portion 221 of bolt insert bore 22 and an inside of a chain casing 7 disposed in a front side of engine 1 to penetrate second wall 291. Second wall 291 forming oil escape bore 23 is thinner than an engine-rear side wall 292 of first wall 29. The opening of oil escape bore 23 to first portion (enlarged diameter portion) 221 is positioned above positioning collar 5 inserted inside lower portion 222 (enlarged diameter portions 221, 311).

A rocker cover (shown in 2-dot line) 6 that covers a valve operating apparatus of engine 1 including camshaft 4 is attached to cylinder head 3. Rocker cover 6 is connected to a cylinder-head-upper surface at the right and left side, and the rear side thereof. The other front side is connected to a shoulder 27 of bearing cap 2a situated in the rear side from seat 26 for cap bolt 21. As a result, after rocker cover 6 is mounted to cylinder head 3, first bearing cap 2a is situated outside of rocker cover 6 and head 21a of cap bolt 21 that bolts first bearing cap 2a to cylinder head 3 is exposed to the engine room.

Camshaft 4 is fixed to cylinder head 3 at each journal as described above, as well as the front end thereof extends beyond an edge of the engine front side of cylinder head 3 and is projected into an inside of chain casing 7 attached to the front side of engine 1. In chain casing 7 a cam sprocket 8 is mounted to the front end of camshaft 4 and a timing chain 9 is wound between cam sprocket 8 and a crank sprocket (not shown). Chain casing 7 constitutes housing space for timing chain 9 and each sprocket and also is connected to an oil pan 10 at the lower end.

Figure 2:
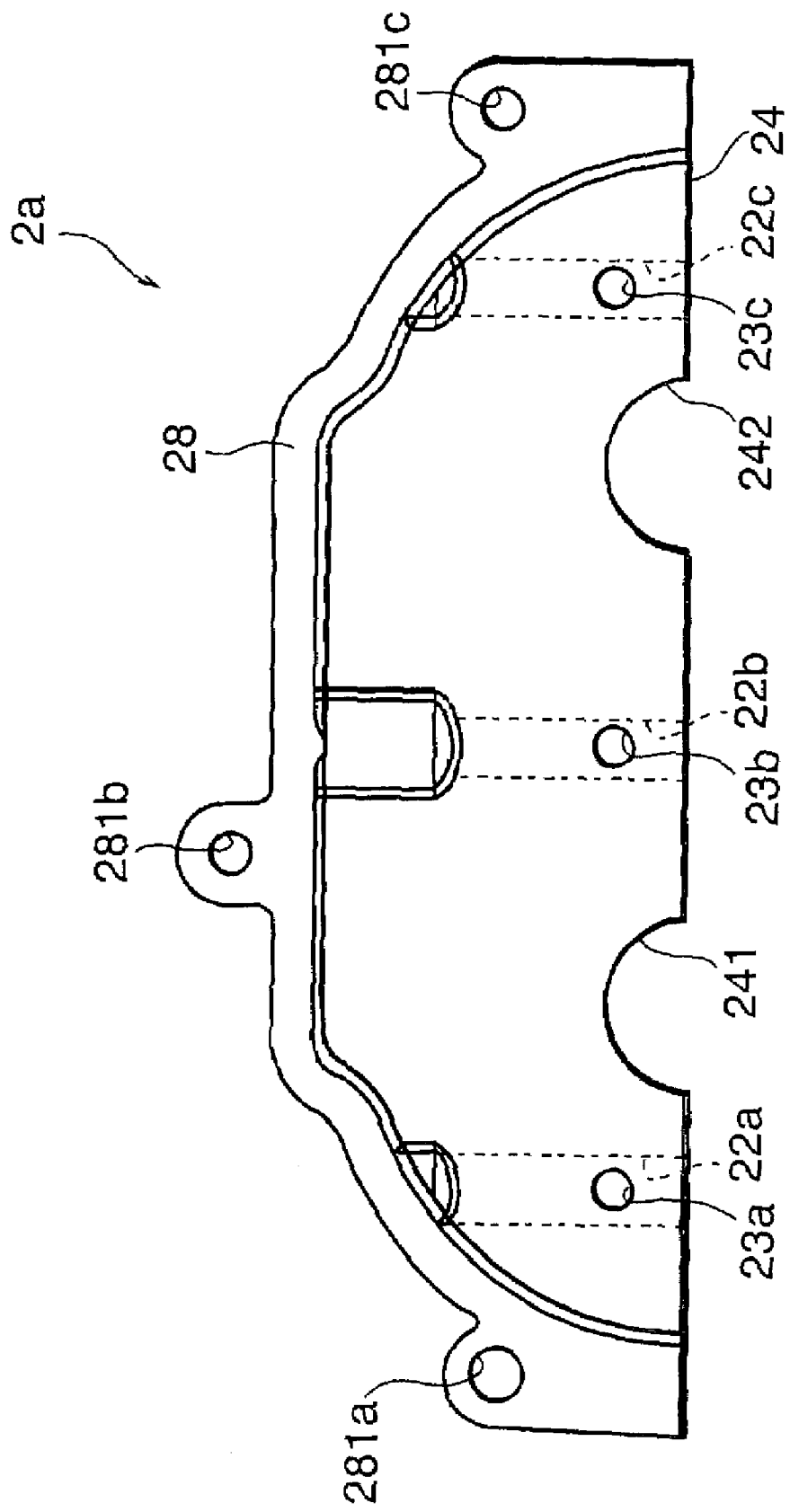
FIG. 2 is a front view of the first bearing cap.

FIG. 2 is a front view of first bearing cap 2a seen from an engine front side. First bearing cap 2a is the type of integrating with bearing caps on an intake side and an exhaust side.

Cylinder-head meeting surface 24 of first bearing cap 2a forms semi round shaft bearing surfaces 241, 242 engaged with a journal of an intake camshaft or an exhaust camshaft. On the other hand, first bearing cap 2a has a periphery having a flange 28 for connection of chain casing 7. First bearing cap 2a and chain casing 7 are fixed together by bolts inserted into bolt insert bores 281a–281c of flange 28.

First bearing cap 2a has three bolt insert bores 22a–22c for cap bolt 21 that bolts first bearing cap 2a to cylinder head 3. These bolt insert bores 22a–22c include oil escape bores 23a–23c respectively. Each of oil escape bores 23a–23c is placed in the same high position from cylinder-head meeting surface 24 and forms connection between bolt insert bores 22a–22c and an inside of chain casing 7.

Figure 3:
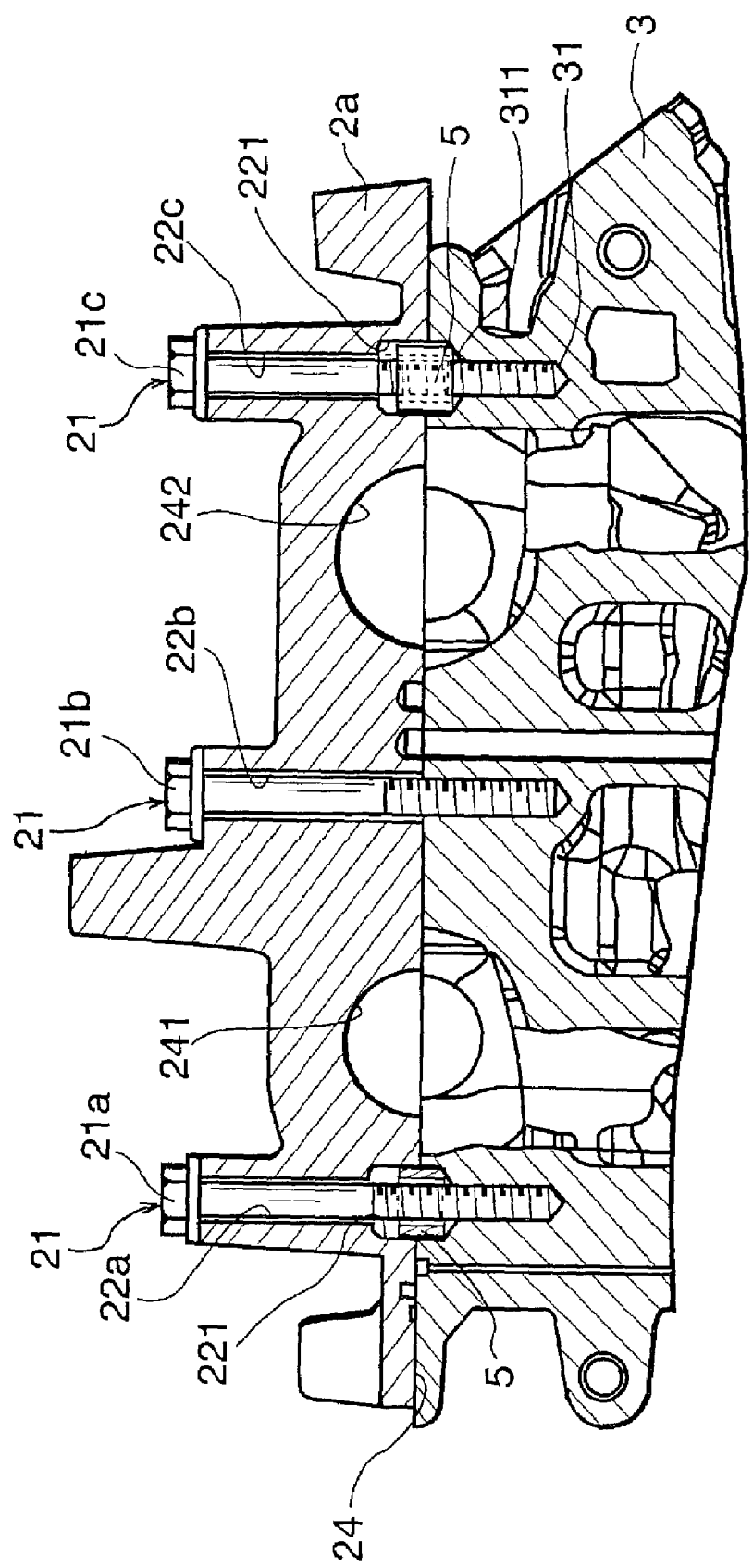
FIG. 3 is a mounting view of the first bearing cap.

FIG. 3 is a mounting view of first bearing cap 2a and shows a cross section view taken along a line A—A of FIG. 1 including first bearing cap 2a.

In the embodiment, first and second (enlarged diameter) portions 221, 311 of bolt insert bore 22 is disposed in two bolt insert bores 22a, 22c positioned in the right and left sides viewed from the front and positioning collar 5 is disposed in bolt insert bores 22a, 22c. As described above, oil escape bores 23a, 23c disposed in each of bolt insert bores 22a, 22c are positioned above two positioning collars 5, 5 with each escape bore having the same height away from cylinder-head meeting surface 24. Positioning collar 5 may be disposed in at least two of bolt insert bores 22a–22c, and not limited to the right and left sides as shown in FIG. 3, may be disposed in a central bolt insert bore 22b including the right or the left side bore.

The bearing apparatus for the camshaft according to the embodiment has the following effects.

In engine 1 lubricant oil reserved in oil pan 10 is suctioned by an oil pump and circulates through lubrication requiring parts inside engine 1 including camshaft 4. The lubricant oil supplied to camshaft 4 permeates into a meeting space between first bearing cap 2a and cylinder head 3 and then, flows into bolt insert bore 22. Without oil escape bore 23, such flown oil fills bolt insert bore 22 and leaks into the engine room through between the head 21a of cap bolt 21 and seat 26 thereof. Since first bearing cap 2a is outside of rocker cover 6, the leaked lubricant oil is discharged outside without being returned to oil pan 10.

However, in the embodiment, oil escape bore 23 is disposed in first bearing cap 2a to penetrating through second wall 291 and, with oil escape bore 23, bolt insert bore 22 is connected to the inside of chain casing 7 and then, oil pan 10. Thereby the lubricant oil reserved in bolt insert bore 22 is discharged through oil escape bore 23 and is returned back to oil pan 10 via chain casing 7.

Figure 4:
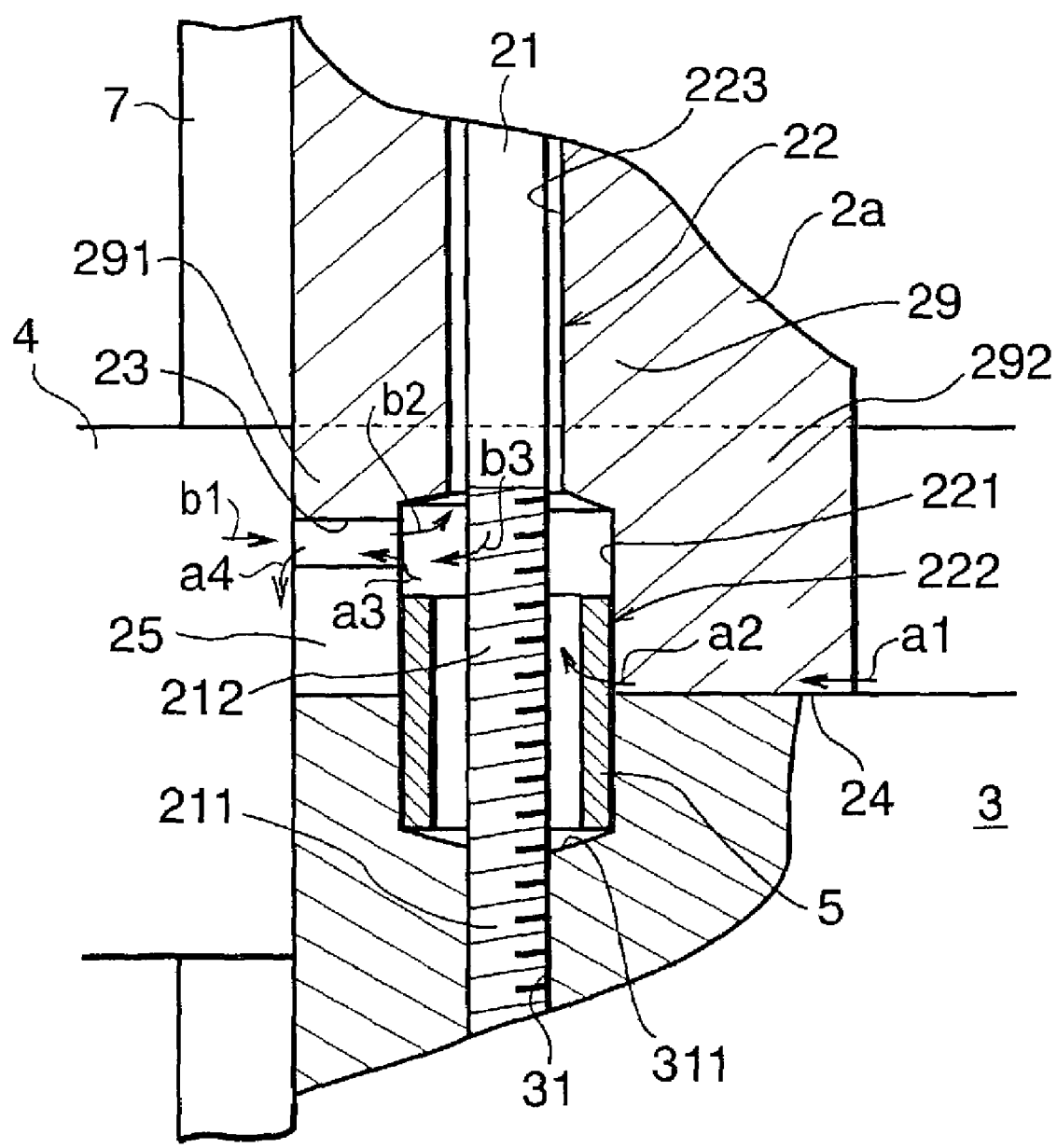
FIG. 4 is a schematic view showing discharge process of lubricant oil from an insert bore of a cap bolt.

FIG. 4 is a schematic explanation view of discharge process of lubricant oil reserved in bolt insert bore 22. The lubricant oil (arrow marking a 1) permeated into the meeting space between first bearing cap 2a and cylinder head 3 flows into bolt insert bore 22 (arrow marking a 2). When a level of lubricant oil reserved in bolt insert bore 22 rises up to oil escape bore 23, the lubricant oil is discharged from bolt insert bore 22 through oil escape bore 23 (arrow marking a 3). The discharged oil is returned back to oil pan 10 via chain casing 7 (arrow marking a 4).

Moreover, in the embodiment, bolt insert bore 22 has enlarged diameter portion 222 (first and second portions 221, 311). Accordingly, lubricant oil flow of bolt insert bore 22 toward the bolt head 21a has more resistance, increasing the oil pressure in lower portion 222 (first and second portions 221, 311). On the other hand, oil escape bore 23 is opened to the first portion 221. As a result, the lubricant oil is smoothly discharged from bolt insert bore 22.

The opening of oil escape bore 23 to bolt insert bore 22 may be disposed in second portion 223 thereof (above lower portion 222). In this case an inner diameter of oil escape bore 23 is minimized to a value needed due to positioning collar 5 not closing oil escape bore 23 and also machining oil escape bore 23 is easier due to more tolerance in distance between oil escape bore 23 and positioning collar 5.

As a result of connection between bolt insert bore 22 and the inside of chain casing 7, blow-by gas flowing into chain casing 7 can flow into bolt insert bore 22 through oil escape bore 23. When the blow-by gas containing foamy oil flows into bolt insert bore 22, the foamy oil changes back into liquid oil in bolt insert bore 22 and then, leaks from between the head 21a of cap bolt 21 and seat 26 thereof.

Coping with the above problem, in addition of the above construction, cap bolt 21 has a mesh portion 211 with screw bore 31 of cylinder head 3 and non-mesh portion 212 situated in lower portion 222 and upper portion 223. Oil escape bore 23 is opened to enlarged diameter portion 221. As seen in FIG. 4, with this construction, the blow-by gas flown into bolt insert bore 22 contacts non-mesh portion 212 (arrow marking b2) within enlarged diameter portion 221 to attach most of the foamy oil contained in the blow-by gas to a surface of cap bolt 21. As a result the liquid oil can be discharged through oil escape bore 23 (arrow marking b3). Oil insert bore 23 may be opened to upper portion 223 whereby the substantially same effect as described above can be obtained.

Further, in the embodiment, oil escape bore 23 is formed with a distance of a portion 25 of second wall 291 above and from cylinder-head meeting surface 24. Accordingly cylinder-head meeting surface 24 is kept flat and by mounting first bearing cap 2a to cylinder head 3, stress concentration does not occur and mounting performance is not damaged. And in case first bearing cap 2a is manufactured by casting, cooling efficiency improves, thereby restraining occurrence of sink mark.

Moreover, oil escape bore 23 is formed in thin first wall 291 of first bearing cap 2a and machining of oil escape bore 23 is reduced thanks to reduction of machining amount thereof.

In the embodiment, oil escape bore 23 is formed in thin first wall 291 in the front side of engine 1 and is opened to the inside of chain casing 7 in the front end of engine 1, but not limited to the construction, bolt insert bore 22 and an inside of rocker cover 6 may be connected as a result of extending oil escape bore 23 from bolt insert bore 22 toward the direction of an engine rear side.

This application claims priority to Japanese Patent Application No. 2002-163415 filed Jun. 4, 2002. The entire disclosure of Japanese Patent Application No. 2002-163415 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined by the appended claims and their equivalents. Moreover, features of the different embodiments may be combined.

What is claimed:

1. A bearing apparatus for a camshaft disposed in a cylinder head in an engine, comprising:
    a bearing cap fastened to the cylinder head to fix relative position of the camshaft to the cylinder head; and
    a cap bolt that fastens the bearing cap to the cylinder heads wherein the bearing cap comprises:
    a cylinder-head meeting surface connected to the cylinder head;
    a first wall that forms a bolt insert bore, wherein the cap bolt is inserted in the bolt insert bore; and
    a second wall that forms part of the first wall; the second wall forming an oil escape bore to penetrate therethrough, wherein the oil escape bore is formed with a distance from the cylinder-head meeting surface, and connects the bolt insert bore to an outside space of the bearing cap;
    wherein the second wall forms the oil escape bore that is connected to an inside space of a chain casing as the outside space of the bearing cap, wherein the chain casing houses a timing chain that delivers engine power to the camshaft.

2. A bearing apparatus according to claim 1, wherein the oil escape bore is connected to an oil pan.

3. A bearing apparatus according to claim 1, wherein the cap bolt includes a screw portion including a mesh portion that engages with the cylinder head and a non-mesh portion therewith, and the oil escape bore is opened to the bolt insert bore to be directed to the non-mesh portion.

4. A bearing apparatus according to claim 1, wherein the cylinder head is covered with a rocker cover.

5. A bearing apparatus according to claim 1, wherein the first wall forms a head seat.

6. A bearing apparatus according to claim 5, wherein a head of the cap bolt is disposed on the head seat so that the head of the cap bolt is exposed to an exterior of the rocker cover.

7. A bearing apparatus for a camshaft disposed in a cylinder head in an engine, comprising:
    a bearing cap fastened to the cylinder head to fix relative position of the camshaft to the cylinder head; and
    a cap bolt that fastens the bearing cap to the cylinder head, wherein the bearing cap comprises:
    a cylinder-head meeting surface connected to the cylinder head;
    a first wall that forms a bolt insert bore, wherein the cap bolt is inserted in the bolt insert bore; and
    a second wall that forms part of the first wall; the second wall forming an oil escape bore to penetrate therethrough, wherein the oil escape bore is formed with a distance from the cylinder-head meeting surface, and connects the bolt insert bore to an outside space of the bearing cap;
    wherein the first wall that forms the bolt insert bore includes a lower portion including a first diameter and an upper portion including a second diameter, the first diameter being larger than the second diameter;
    further comprising a positioning collar disposed in the lower portion and engaged therewith to position the bearing cap to the cylinder head.

8. A bearing apparatus according to claim 7, wherein the second wall forms the oil escape bore that is opened to the bolt insert bore above an upper end of the positioning collar.

9. A bearing apparatus according to claim 7, wherein the second wall forms the oil escape bore that is opened to the lower portion.

10. A bearing apparatus according to claim 7, wherein the cap bolt includes a screw portion including a mesh portion with the cylinder head and a non-mesh portion therewith, and the oil escape bore is opened to the lower portion of the bolt insert bore to be directed to the non-mesh portion.

11. A bearing apparatus according to claim 7, wherein the oil escape bore is connected to an oil pan as the outside space of the bearing cap.

12. A bearing apparatus according to claim 7, wherein the cylinder head is covered with a rocker cover.

13. A bearing apparatus according to claim 7, wherein the first wall forms a head seat.

14. A bearing apparatus according to claim 13, wherein a head of the cap bolt is disposed on the head seat so that the head of the cap bolt is exposed to an exterior of the rocker cover.

* * * * *